(12) United States Patent
Oh

(10) Patent No.: US 12,391,795 B2
(45) Date of Patent: Aug. 19, 2025

(54) POLYMERIZABLE COMPOSITION, AND COPOLYCARBONATE ESTER AND METHOD FOR PRODUCING SAME

(71) Applicant: SK CHEMICALS CO., LTD., Seongnam-si (KR)

(72) Inventor: Kwang Sei Oh, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 821 days.

(21) Appl. No.: 17/287,707

(22) PCT Filed: Oct. 8, 2019

(86) PCT No.: PCT/KR2019/013227
§ 371 (c)(1),
(2) Date: Apr. 22, 2021

(87) PCT Pub. No.: WO2020/085686
PCT Pub. Date: Apr. 30, 2020

(65) Prior Publication Data
US 2021/0380759 A1    Dec. 9, 2021

(30) Foreign Application Priority Data
Oct. 26, 2018 (KR) .................. 10-2018-0129077

(51) Int. Cl.
*C08G 63/64* (2006.01)
*C08G 63/78* (2006.01)

(52) U.S. Cl.
CPC ............. *C08G 63/64* (2013.01); *C08G 63/78* (2013.01)

(58) Field of Classification Search
CPC ...... C08G 63/64; C08G 63/78; C08G 63/672; C08G 64/0208
USPC ......................................... 528/300
See application file for complete search history.

(56) References Cited

U.S. PATENT DOCUMENTS

| | | | | |
|---|---|---|---|---|
| 3,476,785 A * | 11/1969 | Huelsmann | .............. | B01J 31/04 560/1 |
| 4,194,038 A * | 3/1980 | Baker | .................... | C08G 63/64 528/196 |
| 11,421,076 B2 * | 8/2022 | Oh | ....................... | C08G 63/672 |
| 11,479,640 B2 * | 10/2022 | Oh | ....................... | C08G 63/185 |
| 2008/0015331 A1 * | 1/2008 | Terado | ................... | C08G 63/64 528/271 |
| 2012/0322970 A1 * | 12/2012 | Peters | ..................... | C07C 67/08 528/308.1 |
| 2014/0285888 A1 * | 9/2014 | Tanaka | ....................... | C08J 5/18 528/200 |
| 2015/0087804 A1 * | 3/2015 | Motoyoshi | ............. | C08G 63/64 528/370 |
| 2016/0152767 A1 * | 6/2016 | Oh | ........................ | C08G 63/66 528/298 |
| 2020/0216609 A1 * | 7/2020 | Oh | ........................ | C08G 63/64 |
| 2021/0380759 A1 * | 12/2021 | Oh | ........................ | C08G 63/78 |

FOREIGN PATENT DOCUMENTS

| | | |
|---|---|---|
| CN | 106800643 A | 6/2017 |
| JP | 2015-221906 A | 12/2015 |
| KR | 2015-0012152 A | 2/2015 |
| KR | 2016-0090703 A | 8/2016 |
| KR | 2018-0032331 A | 3/2018 |
| KR | 101875597 * | 3/2018 |
| KR | 101975597 * | 3/2018 |
| KR | 2019-0062905 A | 6/2019 |
| KR | 2019-0090364 A | 8/2019 |
| WO | 2019/066292 A1 | 4/2019 |

OTHER PUBLICATIONS

Written Opinion of the International Searching Authority for PCT/KR2019/013227 mailed to Applicant on Jan. 21, 2020—Translation (Year: 2020).*
Long Feng et al "A designed synthetic strategy toward poly(isosorbide terephthalate) copolymers: a combination of temporary modification, transesterification, cyclization and polycondensation", Polym. Chem., Jun. 2015, pp. 7470-7479 (Year: 2015).*
Won Jae Yoon et al "Advanced Polymerization and Properties of Biobased High Tg polyester of Isosorbide and 1,4-Cyclohexanedicarboxylic Acid through in Situ Acetylation", Macromolecules 2013, 46, 2930-2940 (Year: 2013).*
Masahiko Okada et al Biodegradable Polymers Based on Renewable Resources. Synthesis and Biodegradability of Poly(ester carbonate)s Containing 1,4:3,6-Dianhydro-D-glucitol and Sebacic acid. Journal of Applied Polymer Science, vol. 86, 872-880 (2002) (Year: 2002).*

(Continued)

*Primary Examiner* — Ling Siu Cho
*Assistant Examiner* — Ronald Grinsted
(74) *Attorney, Agent, or Firm* — COZEN O'CONNOR

(57) ABSTRACT

A copolycarbonate ester produced from a polymerizable composition according to the present invention can have various physical properties including a melt flow index (MFI) of 43 g/10 minutes to 85 g/10 minutes under a load of 2.16 kg at 260°C. according to ASTM D1238 by being copolymerized through the melt-polycondensation of: 1,4:3,6-dianhydrohexitol and/or a diol compound other than 1,4:3,6-dianhydrohexitol including 1,14-tetradecanediol, 1,4-cyclohexanedimethanol, tricyclodecane dimethanol, 3,9-bis(1,1-dimethyl-2-hydroxyethyl)-2,4,8,10-tetraoxaspiro[5,5]udecane, bicycle[2.2.2]octane-2,3-dimethanol, 2,2-bis(4-hydroxycyclohexyl)propane, 2,2,4,4-tetramethyl-1,3-cyclobutanediol, 1,1-bis(4-hydroxyphenyl)-3,3,5-trimethylcyclohexane, 9,9-bis(4-hydroxyphenyl)fluorene, or tetrahydofuran-2,5-dimethanol; a carbonate compound; and a petroleum-based and/or bio-based diphenyl ester and/or an additional diphenyl ester compound other than the petroleum-based and/or bio-based diphenyl ester including diphenyl sebacate, diphenyl decahydronaphthalene-2,6-dicarboxylate, diphenyl tetrahydrofuran-2,5-dicarboxylate, or 2,5-diphenyl-furandicarboxylate, and can thus be usefully applied to the manufacture of segmented products.

12 Claims, No Drawings

(56) References Cited

OTHER PUBLICATIONS

Steven K. Burgess et al "Chain Mobility, Thermal, and Mechanical Properties of Poly(ethylene furanoate) Compared to Poly(ethylene terephthalate)", Macromolecules 2014, 47, 1383-1391 (Year: 2014).*
Park et al "Copolycarbonates of bio-based rigid isosorbide and flexible 1,4-cyclohexanedimethanol: Merits over bisphenol—A based polycarbonates", Polymer vol. 116, May 5, 2017, pp. 153-159 ) published online Mar. 28, 2017. (Year: 2017).*
Kasmi et al Synthesis and crystallization of new fully renewable resources-based copolyesters: Poly(1,4-cyclohexanedimethanol-co-isosorbide 2,5-furandicarboxylate) (Year: 2018).*
Noordover, et al "Chemistry, Functionality, and Coating Performance of Biobased Copolycarbonates from 1,4:3,6-Dianhydrohexitols", Journal of Applied Polymer Science, vol. 121, 1450-1463 (2011) (Year: 2011).*
W. Borman "Molecular Weight-Viscosity Relationships for Poly (1,4- butylene Terephthalate)", Journal of Applied Polymer Science, vol. 22, 2119-2126 (1978) (Year: 1978).*
Extended European Search Report for EP Patent Application No. 19876622.2 dated Jun. 29, 2022, 6 pages.
International Application No. PCT/KR2019/013227, International Search Report mailed Jan. 21, 2020, 5 pages.

\* cited by examiner

POLYMERIZABLE COMPOSITION, AND COPOLYCARBONATE ESTER AND METHOD FOR PRODUCING SAME

TECHNICAL FIELD

The present invention relates to a polymerization composition comprising a petroleum-based and/or biobased monomer, a copolycarbonate ester copolymerized from the monomer, and a process for preparing the same.

BACKGROUND ART

A polycarbonate ester prepared by melt-polycondensation of 1,4:3,6-dianhydrohexitol with a carbonate, a 1,4-cyclohexanedicarboxylate, and/or a terephthalate is a bioplastic that contains 1,4:3,6-dianhydrohexitol, which is a biobased monomer derived from biomass. The biobased polycarbonate ester has high transparency of poly(methyl methacrylate) (PMMA), which is a representative transparent general-purpose resin, and high thermal resistance of bisphenol A (BPA) polycarbonate.

Such biobased polycarbonate esters do not contain BPA that causes environmental hormones, and it is also possible to improve the ductility of the molecular structure of 1,4:3,6-dianhydrohexitol by copolymerizing a 1,4-cyclohexanedicarboxylate monomer having an aliphatic ring molecular structure. In addition, it is possible to compensate the disadvantage of a carbonate bond by replacing some of the carbonate bonds with an ester bond.

In recent years, as the applications to which polymer resins are applied are diversified and specified, the required physical properties are gradually changing specifically and extensively. However, since general-purpose polymer resins are mostly obtained from limited monomers, there is a limit to the development of products capable of satisfying various physical properties in response to the changes in the application market as described above. Therefore, the development of various copolymers utilizing the composition of the conventional polymer resins is actively performed.

Meanwhile, the key monomer composition for producing biobased polycarbonate esters is 1,4:3,6-dianhydrohexitol, a carbonate monomer (e.g., diphenyl carbonate(DPC)), and an ester monomer (e.g., 1,4-diphenyl-cyclohexanedicarboxylate (DPCD) and diphenyl terephthalate(DPT)). The basic physical properties, characteristics, and the like of a biobased polycarbonate ester may vary with various combinations of these monomers.

However, in order to meet the expansion of the bioplastic market in accordance with the advent of the environmentally friendly era in tandem with the change in the application market of polymer resins as mentioned above, it is necessary to expand the basic physical properties and characteristics of biobased polycarbonate esters and to expand their applications accordingly. As a result, it is required to use petroleum-based and/or biobased comonomers that meet the properties of various applications.

DETAILED DESCRIPTION OF THE INVENTION

Technical Problem

Accordingly, the present invention aims to provide, as a monomer for preparing a biobased polycarbonate ester, a polymerization composition comprising 1,4:3,6-dianhydrohexitol, a diphenyl ester monomer, an additional diphenyl ester compound and a copolycarbonate ester, and a process for preparing the same.

Solution to the Problem

To achieve the above object, the present invention provides a polymerization composition, which comprises (a) (a-1) 1,4:3,6-dianhydrohexitol and (a-2) a diol compound other than 1,4:3,6-dianhydrohexitol; and (b) (b-1) a carbonate compound represented by the following Formula 1, (b-2) a compound represented by the following Formula 2, a compound represented by the following Formula 3, or both, and (b-3) an additional diphenyl ester compound other than the compounds of the above Formulae 2 and 3, wherein when the mol fraction of the component (a-1) is x ($0.1 \leq x \leq 1$), the mol fraction of the component (a-2) is $1-x$, and when the total mol fraction of the components (b-1) and (b-2) is y ($0.1 \leq y \leq 1$), the mol fraction of the component (b-3) is $1-y$, provided that both x and y are not 1 at the same time.

[Formula 1]

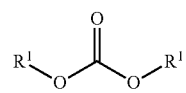

[Formula 2]

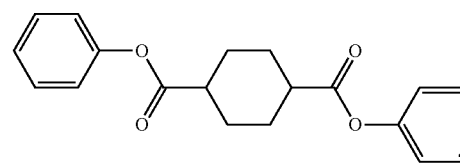

[Formula 3]

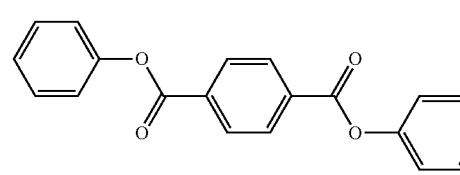

In the above formulae, $R^1$ is each independently an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to carbon atoms, an arylsulfonyl group having 6 to 18 carbon atoms, and an ester substituent.

In order to achieve the another object, the present invention provides a process for preparing a copolycarbonate ester, which comprises subjecting the polymerization composition to a melt-polycondensation reaction to prepare a copolycarbonate ester.

In order to achieve the still another object, the present invention provides a copolycarbonate ester prepared from the polymerization composition.

In order to achieve the still another object, the present invention provides a molded article prepared from the copolycarbonate ester.

Advantageous Effects of the Invention

The copolycarbonate ester prepared from the polymerization composition of the present invention is copolymerized by melt-polycondensation of 1,4:3,6-dianhydrohexitol and/or a diol compound other than 1,4:3,6-dianhydrohexitol, a carbonate compound, and a petroleum-based and/or biobased diphenyl ester and/or an additional diphenyl ester compound other than the petroleum-based and/or biobased diphenyl ester, whereby it can have various physical properties. Thus, it can be advantageously used for the preparation of products for specified purposes.

Best Mode for Carrying Out the Invention

The present invention is not limited to the disclosures given below, but it may be modified into various forms as long as the gist of the invention is not changed.

Throughout the description of the embodiments, the term "comprise" means that other elements may be included unless otherwise indicated. In addition, all numbers expressing quantities of components, reaction conditions, and the like used herein are to be understood as being modified by the term "about" unless otherwise indicated.

Polymerization Composition

The present invention provides a polymerization composition, which comprises (a) (a-1) 1,4:3,6-dianhydrohexitol and (a-2) a diol compound other than 1,4:3,6-dianhydrohexitol; and (b) (b-1) a carbonate compound represented by the following Formula 1, (b-2) a compound represented by the following Formula 2, a compound represented by the following Formula 3, or both, and (b-3) an additional diphenyl ester compound other than the compounds of the above Formulae 2 and 3, wherein when the mol fraction of the component (a-1) is x (0.1≤x≤1), the mol fraction of the component (a-2) is 1−x, and when the total mol fraction of the components (b-1) and (b-2) is y (0.1≤y≤1), the mol fraction of the component (b-3) is 1−y, provided that both x and y are not 1 at the same time.

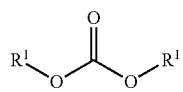
[Formula 1]

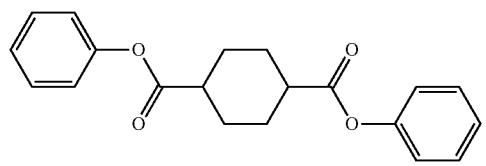
[Formula 2]

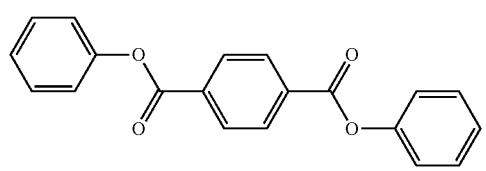
[Formula 3]

In the above formulae, $R^1$ is as defined above.

Specifically, x may be 0.5 to 1, 0.6 to 1, or 0.7 to 1, and y may be 0.5 to 1, 0.6 to 1, or 0.7 to 1. Here, both x and y are not 1 at the same time. That is, the polymerization composition of the present invention necessarily comprises any one of the components (a-2) and (b-3) and may comprise both.

The components (a) and (b) may be petroleum-based and/or biobased monomers. Specifically, the compound represented by the above Formula 2, the compound represented by the above Formula 3, and the components (a-2) and (b-3) may each independently be biobased monomers derived from at least one selected from the group consisting of sugar, limonene, and lignin. A detailed description of each component is as follows.

(a) Diol Compound (a-1) 1,4:3,6-Dianhydrohexitol

The polymerization composition of the present invention comprises 1,4:3,6-dianhydrohexitol (a-1).

1,4:3,6-dianhydrohexitol (a-1) is derived from biomass and may be a well-known compound. Specifically, 1,4:3,6-dianhydrohexitol may be isomannide, isosorbide, or isoidide. Specifically, it may be isosorbide.

1,4:3,6-dianhydrohexitol may be in the form of powder, flake, or an aqueous solution.

The purity of 1,4:3,6-dianhydrohexitol is closely related to the physical properties of the copolycarbonate ester to be prepared. Specifically, as the purity of 1,4:3,6-dianhydrohexitol increases, the heat resistance, transparency, and mechanical properties of the copolycarbonate ester to be prepared may be enhanced.

If 1,4:3,6-dianhydrohexitol is exposed to air for a long period of time, however, it may be readily oxidized and discolored, which may give rise to a problem that the color and molecular weight of the final polymer would not be satisfactory. Thus, it is necessary to minimize the exposure of 1,4:3,6-dianhydrohexitol to air. Once 1,4:3,6-dianhydrohexitol is exposed to air, it is preferably stored with a deoxidizing agent such as an oxygen absorber.

In addition, it is very important to purify 1,4:3,6-dianhydrohexitol by removing the impurities contained therein, which have been produced in the multi-step process of preparing 1,4:3,6-dianhydrohexitol, in order to maintain the purity thereof. Specifically, in the purification of 1,4:3,6-dianhydrohexitol by vacuum distillation, it is crucial to remove a trace level of acidic liquid components that can be removed by an initial separation and alkali metal components that can be removed by a residue separation. Each of the acidic liquid components and alkali metal components may be kept at a level of 10 ppm or lower, 5 ppm or lower, or 3 ppm or lower.

(a-2) Diol Compound Other than 1,4:3,6-Dianhydrohexitol

The polymerization composition of the present invention may comprise a diol compound (a-2) other than 1,4:3,6-dianhydrohexitol.

The additional diol compound (a-2) other than 1,4:3,6-dianhydrohexitol may be obtained from a petroleum-based and/or biomass raw material, but the kind thereof is not limited.

The additional diol compound (a-2) other than 1,4:3,6-dianhydrohexitol may be used as a primary, secondary, or tertiary diol or various combinations thereof, depending on the desired physical properties.

For example, the additional diol compound (a-2) other than 1,4:3,6-dianhydrohexitol may be at least one selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol (TDD), 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol (CHDM), tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, bisphenol, 2,2'-biphenyl, 1,5-dihydroxynaphthalene, 2,2-bis(4-hydroxyphenyl)propane, 2,2-bis(4-hydroxy-3,5-dimehtylphenyl)propane, 2,2-bis(4-hydroxy-3,5-diehtylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethylcyclohexane (BPA TMC), 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl)sulfone, 1,3-bis[2-(4-hydroxyphenyl)-2-propyl]benzene, 2,2-bis(4-hydroxy-3-isopropyl-phenyl)propane, bis(4-hydroxyphenyl)methane, 1,1-bis(4-hydroxyphenyl)ethane, bis(4-hydroxyphenyl)-2,2-dichloroethylene, 2,2-bis(3-methyl-4-hydroxyphenyl)propane, bis(4-hydroxyphenyl)diphenylmethane, 2,2-bis(4-hydroxyphenyl)butane, 2,2-bis(4-hydroxyphenyl)hexafluoropropane, 3-(4-hydroxyphenyl)-1,1,3-trimethyl-5-indanol, 9,9-bis(4-hydroxyphenyl)fluorene (BPA fluorene), 3,3'-spiro-bis(1,1-dimethyl-2,3-dihydro-1H-inden-5-ol), dispiro[5.1.5.1]tetradecane-7,14-diol, and 5,5'-(1-methylethylidene)bis(2-furanmethanol), 2,4:3,5-di-o-methylene-D-mannitol, and tetrahydrofuran-2,5-dimethanol that can be prepared from biomass raw materials.

Specifically, the additional diol compound (a-2) other than 1,4:3,6-dianhydrohexitol may be 1,14-tetradecanediol (TDD), 1,4-cyclohexanedimethanol (CHDM), tricyclodecane dimethanol, 3,9-bis(1,1-dimethyl-2-hydroxyethyl)-2,4,8,10-tetraoxaspiro[5,5]undecane, bicycle[2.2.2]octane-2,3-dimethanol, 2,2-bis(4-hydroxycyclohexyl)propane, 2,2,4,4-tetramethyl-1,3-cyclobutanediol, 1,1-bis(4-hydroxyphenyl)-3,3,5-trimethylcyclohexane (BPA TMC), 9,9-bis(4-hydroxyphenyl)fluorene (BPA fluorene), or tetrahydrofuran-2,5-dimethanol.

(b) Carbonate Compound and Diphenyl Ester Compound (b-1) Carbonate Compound Represented by the Above Formula 1

The compound (b-1) represented by the above Formula 1 may be dimethyl carbonate, diethyl carbonate, di-t-butyl carbonate, diphenyl carbonate (DPC), ditolyl carbonate, or bis(methyl salicyl) carbonate. Specifically, it may be diphenyl carbonate, ditolyl carbonate, or bis(methyl salicyl) carbonate.

(b-2) Compound Represented by the Above Formula 2. Compound Represented by the Above Formula 3, or Both The compound represented by the above Formula 2 and the compound represented by the above Formula 3 each may be known petroleum-based monomers or monomers derived from biomass such as sugar, limonene, and lignin.

Specifically, the compound represented by the above Formula 2 may be obtained from a compound represented by the following Formula 2', and the compound represented by the above Formula 3 may be obtained from a compound represented by the following Formula 3':

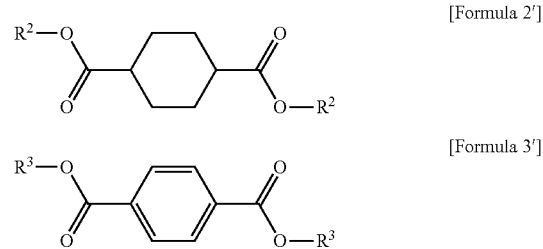

In the above formulae, $R^2$ and $R^3$ are each independently hydrogen or methyl.

The compounds represented by Formula 2' and Formula 3' may be obtained by the following methods from biomass such as sugar, limonene, and lignin as raw materials, respectively.

Once biobased terephthalic acid (TPA) has been prepared through various intermediate substances from biomass such as sugar, limonene, and lignin, the biobased TPA and ethanol may be subjected to an esterification reaction to prepare biobased dimethyl terephthalate (DMT), the biobased DMT may be subjected to a ring saturation hydrogenation reaction to prepare biobased 1,4-cyclohexanedicarboxylate (DMCD), and the biobased DMCD may be subjected to a hydrolysis reaction to prepare biobased 1,4-cyclohexanedicarboxylic acid (CHDA). Meanwhile, the biobased TPA may be subjected to a ring saturation hydrogenation reaction to directly prepare biobased CHDA (see the following Reaction Scheme 1).

[Reaction Scheme 1]

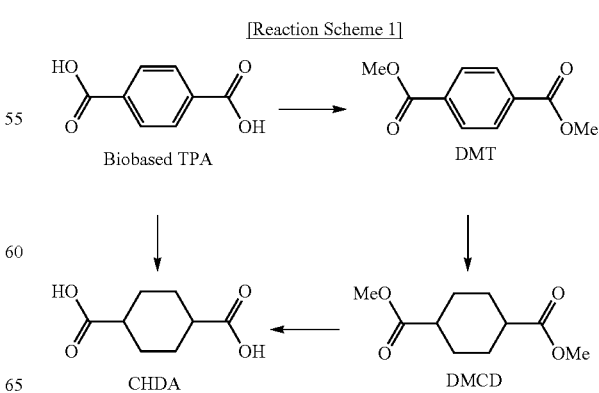

(b-3) Additional Diphenyl Ester Compound Other than the Compounds of the Above Formulae 2 and 3

The polymerization composition of the present invention may comprise an additional diphenyl ester compound (b-3) other than the compounds represented by the above Formulae 2 and 3.

The component (b-3) may be obtained from a petroleum-based and/or biomass raw material, but the kind thereof is not limited.

The component (b-3) may be prepared by reacting a primary, secondary, or tertiary dicarboxylate, dicarboxylic acid, or various combinations thereof with phenol or a phenol substituent, depending on the desired physical properties.

For example, the component (b-3) may be at least one selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene-2,4-dicarboxylate, diphenyl decahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl-ethylidenebisbenzoate, 4,4'-diphenyl-oxybisbenzoate, 2,4-diphenyl-naphthalenedicarboxylate, 2,5-diphenyl-naphthalenedicarboxylate, 2,6-diphenyl-naphthalenedicarboxylate, 2,7-diphenyl-naphthalenedicarboxylate, and 2,5-diphenyl-furandicarboxylate (DPFD).

Specifically, the component (b-3) may be diphenyl sebacate, diphenyl decahydronaphthalene-2,6-dicarboxylate, diphenyl tetrahydrofuran-2,5-dicarboxylate, or 2,5-diphenyl-furandicarboxylate (DPFD).

Copolycarbonate Ester

The present invention may provide a copolycarbonate ester prepared from the polymerization composition as described above.

Specifically, the components (a) and (b) may be subjected to a melt-polycondensation reaction to prepare a copolycarbonate ester containing various repeat units.

For example, 1,4:3,6-dianhydrohexitol (a-1) may be reacted with the carbonate compound (b-1) represented by the above Formula 1 to form repeat unit 1 (a carbonate bond) represented by the following Formula 4.

1,4:3,6-dianhydrohexitol (a-1) may be reacted with the compound represented by the above Formula 2 to form repeat unit 2 (an ester bond) represented by the following Formula 5.

In such event, the cis/trans ratio of 1,4-cyclohexanedicarboxylate moiety in the repeat unit 2 (Formula 5) may be 1/99 to 99/1%, 20/80 to 80/20%, or 30/70 to 70/30%.

1,4:3,6-dianhydrohexitol (a-1) may be reacted with the compound represented by the above Formula 3 to form repeat unit 3 (an ester bond) represented by the following Formula 6.

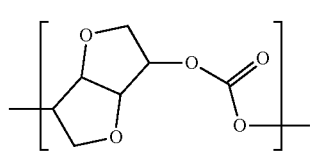
[Formula 4]

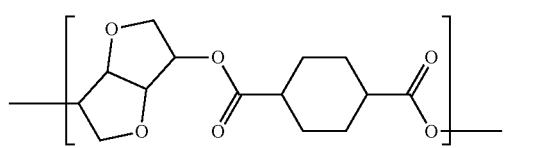
[Formula 5]

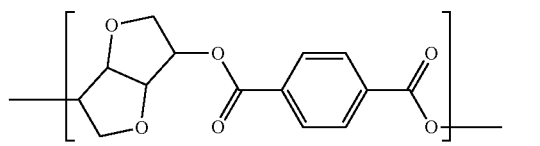
[Formula 6]

Accordingly, since the copolycarbonate ester of the present invention can selectively contain repeat units of various combinations, comprising (i) the repeat unit 1, (ii) the repeat unit 2, the repeat unit 3, or both, and (iii) other repeat units, it is more advantageous for achieving physical properties suitable for various applications.

The copolycarbonate ester may have a glass transition temperature (Tg) of 100 to 240° C., 110 to 240° C., 120 to 240° C., or 160 to 240° C.

The copolycarbonate ester may have an intrinsic viscosity (IV) of 0.3 to 2.3 dl/g, 0.3 to 2.0 dl/g, 0.3 to 1.5 dl/g, 0.3 to 1.0 dl/g, 0.4 to 2.0 dl/g, 0.4 to 1.5 dl/g, or 0.4 to 1.0 dl/g.

The copolycarbonate ester may have a light transmittance according to ASTM D1003 of 85% or more, 88% or more, 90% or more, 85 to 97%, 85 to 95%, or 88 to 93%.

The copolycarbonate ester may have a melt flow index (MFI) of 10 g/10 minutes or more, 10 to 150 g/10 minutes, or 10 to 130 g/10 minutes under a load of 2.16 kg at 260° C. according to ASTM D1238.

The copolycarbonate ester may have a biobased carbon content derived from biomass according to ASTM D6866 of 30% or more, 30 to 95%, or 30 to 90%.

Specifically, the organic carbon content (% $C_{bio}$) derived from biomass of the copolycarbonate ester may be defined by the following Equation 1.

$$\% \ C_{bio} = \text{(content ratio of } ^{14}C \text{ isotope relative to } ^{12}C \text{ isotope in the carbon atoms of copolycarbonate ester)/(content ratio of } ^{14}C \text{ isotope relative to } ^{12}C \text{ isotope in the carbon atoms of biomass reference material)} \times 100 \quad \text{[Equation 1]}$$

The method of measuring the organic carbon content derived from biomass according to Equation 1 may conform to the method described in ASTM D6866 (Standard Test Methods for Determining the Biobased Content Using Radiocarbon Analysis). The technical meaning and measurement method of the organic carbon content derived from biomass are as follows.

In general, unlike organic substances such as resins derived from fossil raw materials, organic substances such as resins derived from biomass are known to contain the isotope $^{14}C$. More specifically, it is known that all organic substances taken from living organisms such as animals or plants contain three types of isotopes $^{12}C$ (about 98.892% by weight), $^{13}C$ (about 1.108% by weight), and $^{14}C$ (about $1.2 \times 10^{-10}$% by weight) together as carbon atoms and that the ratio of each isotope is kept constant. This is the same as the ratio of each isotope in the atmosphere. Since living organisms continue to metabolize and exchange carbon atoms with the external environment, this isotope ratio remains constant.

Meanwhile, $^{14}C$ is a radioactive isotope, and its content may decrease over time (t) according to the following Equation 2.

$$n=n_0 \cdot \exp(-at) \quad \text{[Equation 2]}$$

In Equation 2, $n_0$ represents the initial content of the $^{14}C$ isotope, n represents the content of the $^{14}C$ isotope remaining after t hours, and a represents the decay constant (or radioactive constant) related to the half-life.

In Equation 2, the half-life of the $^{14}C$ isotope is about 5,730 years. In view of the half-life, organic substances taken from living organisms that constantly interact with the external environment, i.e., organic substances such as resins derived from biomass, can maintain a substantially constant content of the $^{14}C$ isotope and a substantially constant content ratio with other isotopes, for example, $^{14}C/^{12}C$=about $1.2 \times 10^{-12}$, despite the slight reduction in the content of the isotope.

On the other hand, fossil fuels such as coal or oil have been blocked from exchanging carbon atoms with the external environment for more than 50,000 years. Thus, since organic substances such as resins derived from fossil raw materials contain less than 0.2% of the initial content of the $^{14}C$ isotope, as estimated according to Equation 2 above, it can be seen that they do not substantially contain the $^{14}C$ isotope.

The above points are taken into consideration in Equation 1 above. The denominator may be the content ratio of the isotope $^{14}C/^{12}C$ derived from biomass, for example, about $1.2 \times 10^{-12}$, and the numerator may be the content ratio of $^{14}C/^{12}C$ contained in the resin to be measured.

As described above, the biobased carbon content derived from biomass among the entire carbon atoms in the copolycarbonate ester may be calculated by Equation 1 above based on the fact that carbon atoms derived from biomass maintain an isotopic content ratio of about $1.2 \times 10^{-12}$, whereas carbon atoms derived from fossil fuels have such an isotopic content ratio that is substantially zero.

Here, the content of each carbon isotope may be determined according to one of two methods described in the ASTM D6866 standard.

Specifically, the radiocarbon analysis, which is a method of measuring radiation generated at the time of fission of carbon, and a method using an accelerated mass spectrometer that directly measures the concentration of radioactive carbon in a sample, may be used to calculate the organic carbon content derived from biomass in Equation 1.

Process for Preparing a Copolycarbonate Ester

The present invention provides a process for preparing a copolycarbonate ester, which comprises subjecting the polymerization composition to a melt-polycondensation reaction to prepare a copolycarbonate ester.

Specifically, the present invention is capable of preparing a copolycarbonate ester by subjecting (a) (a-1) 1,4:3,6-dianhydrohexitol and (a-2) a diol compound other than 1,4:3,6-dianhydrohexitol; and (b) (b-1) a carbonate compound represented by the above Formula 1, (b-2) a compound represented by the above Formula 2, a compound represented by the above Formula 3, or both, and (b-3) an additional diphenyl ester compound other than the compounds of the above Formulae 2 and 3 to a melt-polycondensation reaction.

Details on the component (a) are the same as described above.

The carbonate compound (b-1) represented by the above Formula 1 may be dimethyl carbonate, diethyl carbonate, di-t-butyl carbonate, diphenyl carbonate, ditolyl carbonate, or bis(methyl salicyl) carbonate. In view of the fact that the melt-polycondensation reaction is carried out under reduced pressures, diphenyl carbonate, ditolyl carbonate, or bis(methyl salicyl) carbonate may be preferably used.

The compounds represented by the above Formulae 2 and 3 may be prepared by the following method for use.

The compound represented by the above Formula 2 may be obtained by reacting a compound represented by the above Formula 2' with a halogen-containing compound (or halogenated compound) to convert it into an intermediate reactant (e.g., a compound represented by the following Formula 2") containing a halogen functional group at the terminal, followed by subjecting it to a nucleophilic reaction with phenol or a phenol substituent, or by an esterification or transesterification reaction of a compound represented by the above Formula 2' with phenol or a phenol substituent (see Reaction Scheme 2 below):

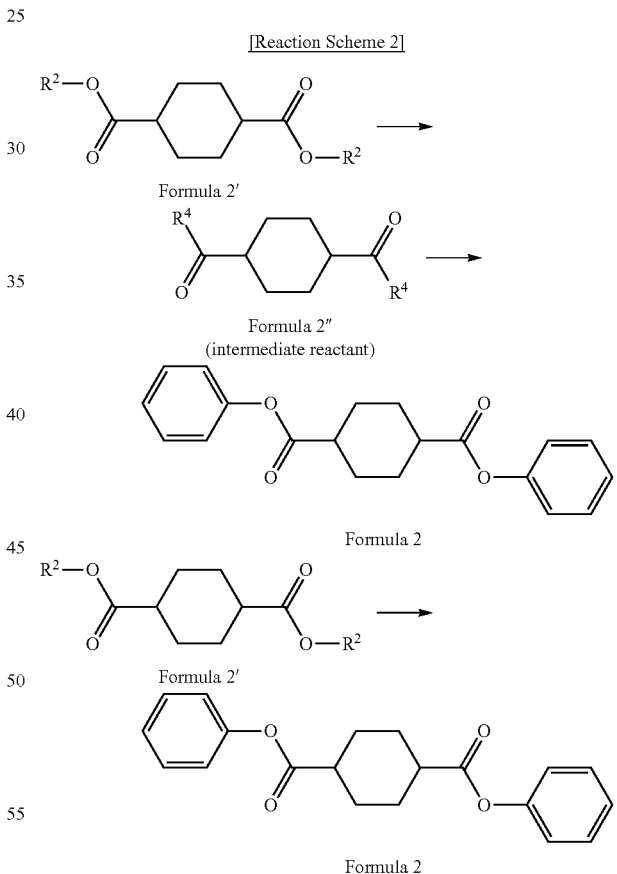

[Reaction Scheme 2]

Formula 2'

Formula 2″
(intermediate reactant)

Formula 2

Formula 2'

Formula 2

In the above Reaction Scheme, $R^2$ is each independently hydrogen or methyl, and $R^4$ is each independently F, Cl, or Br.

Specifically, the compound represented by the above Formula 2' may be reacted with a halogenated compound to prepare an intermediate reactant (e.g., a compound represented by the above Formula 2") containing a halogen functional group at the terminal. The compound represented by the above Formula 2" may be 1,4-cyclohexanedicarbonyl chloride (CHDC) in which $R^4$ is Cl.

The halogenated compound may be at least one selected from the group consisting of phosgene, triphosgene, thionyl chloride, oxalyl chloride, phosphorus trichloride, phosphorus pentachloride, phosphorus pentabromide, and cyanuric fluoride. Specifically, the halogenated compound may be at least one chlorinating agent selected from the group consisting of phosgene, thionyl chloride, and oxalyl chloride, from which the reaction by-products can be readily removed. In addition, the halogenated compound may preferably be phosgene from a commercial viewpoint.

The amount of the halogenated compound to be added may be 1 to 10 times, 1.5 to 7.5 times, or 2 to 5 times the molar amount of the compound represented by the above Formula 2' initially employed.

The reaction conditions and time in the conversion to the intermediate reactant may vary depending on the type of the compound represented by the above Formula 2' and the halogenated compound. Specifically, the conversion to the intermediate reactant may be carried out at atmospheric pressure at a temperature of −30 to 150° C. for 5 minutes to 48 hours. More specifically, the conversion to the intermediate reactant may be carried out at atmospheric pressure at a temperature of 20 to 100° C. or 40 to 80° C. for 10 minutes to 24 hours.

In the conversion to the intermediate reactant, an organic solvent may be used to dissolve or disperse the compound represented by the above Formula 2'.

In such event, the organic solvent that may be used is, for example, benzene, toluene, xylene, mesitylene, methylene chloride, dichloroethane, chloroform, carbon tetrachloride, monochlorobenzene, o-dichlorobenzene, tetrahydrofuran, dioxane, acetonitrile, or a mixture thereof.

In order to increase the conversion rate and the reaction yield of the intermediate reactant, a catalyst may be used depending on the kind of the compound represented by the above Formula 2' and the halogenated compound used in the conversion to the intermediate reactant.

The type of the catalyst is not particularly limited as long as it meets this object. For example, an organic catalyst, an inorganic catalyst, or the like may be used.

Dimethylformamide, dimethylacetamide, methylpyrrolidone, dimethyl imidazolidinone, tetramethylurea, tetraethylurea, tetrabutylurea, or a mixture thereof may be used as the organic catalyst.

Aluminum chloride ($AlCl_3$), iron chloride ($FeCl_3$), bismuth chloride ($BiCl_3$), gallium chloride ($GaCl_3$), antimony pentachloride ($SbCl_5$), boron trifluoride ($BF_3$), bismuth trifluoromethanesulfonate ($Bi(OTf)_3$), titanium tetrachloride ($TiCl_4$), zirconium tetrachloride ($ZrCl_4$), titanium tetrabromide ($TiBr_4$), zirconium tetrabromide ($ZrBr_4$), or a mixture thereof may be used as the inorganic catalyst.

Specifically, dimethylformamide, dimethyl imidazolidinone, or tetramethylurea may be used as the organic catalyst, and aluminum chloride or titanium tetrachloride may be used as the inorganic catalyst. More specifically, it is commercially advantageous to use dimethylformamide as the organic catalyst and aluminum chloride as the inorganic catalyst.

The amount of the catalyst to be used in the conversion to the intermediate reactant is not particularly limited, but it varies depending on the kind of the compound represented by the above Formula 2' and the halogenated compound. Specifically, the amount of the catalyst used in the conversion to the intermediate reactant may be in the range of greater than 0 to 10% by mol, greater than 0 to 5% by mol, or greater than 0 to 3% by mol, based on the total molar amount of the compound represented by the above Formula 2' initially employed.

If the amount of the catalyst used in the conversion to the intermediate reactant is within the above range, it is possible to prevent the problems that the reaction rate is lowered and that a runaway reaction and an exothermic reaction are induced.

The phenol substituent may be a compound represented by the following Formula 7.

[Formula 7]

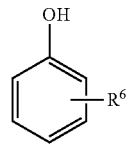

In the above formula, $R^6$ is an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent. In such event, the ester substituent may be an alkyl ester having 1 to 18 carbon atoms, a cycloalkyl ester having 4 to 20 carbon atoms, or an aryl ester having 6 to 18 carbon atoms.

The molar ratio of the compound represented by the above Formula 2" to phenol or a phenol substituent in the above nucleophilic reaction may be 1:1 to 1:5 or 1:2 to 1:3.

Within the above range, the compound represented by the above Formula 2 may be prepared in high yield. If it is outside the above range, for example, if the amount of phenol or a phenol substituent is insufficient, the production yield may be reduced.

In addition, the compound represented by the above Formula 2 may be prepared by an esterification or transesterification reaction of a compound represented by the above Formula 2' with phenol or a phenol substituent.

The esterification or transesterification reaction may be carried out at 20 to 300° C. Specifically, the esterification or transesterification reaction may be carried out at atmospheric pressure at 50 to 250° C. or 100 to 200° C. or under a pressure of 0.1 to 10 kgf/cm² or 1 to 5 kgf/cm² at 50 to 300° C.

The esterification or transesterification reaction may be carried out for 5 minutes to 48 hours or 10 minutes to 24 hours.

In the esterification or transesterification reaction, the molar ratio of the compound represented by the above Formula 2' to phenol or a phenol substituent may be 1:2 to 1:40. Specifically, in the esterification or transesterification reaction, the molar ratio of the compound represented by the above Formula 2' to phenol or a phenol substituent may be 1:3 to 1:30 or 1:4 to 1:20.

If the molar ratio of the compound represented by the above Formula 2' and phenol or a phenol substituent is within the above range, it is possible to prevent a reduction in the production yield.

In such event, the cis/trans ratio of the compound represented by the above Formula 2 may be 1/99 to 99/1%, 10/90 to 90/10%, or 20/80 to 80/20%.

The compound represented by the above Formula 3 may be obtained by reacting a compound represented by the following Formula 3' with a halogenated compound to convert it into an intermediate reactant (e.g., a compound represented by the following Formula 3") containing a halogen functional group at the terminal, followed by subjecting it to a nucleophilic reaction with phenol or a phenol substituent, or by an esterification or transesterification reaction of a compound represented by the following Formula 3' with phenol or a phenol substituent (see Reaction Scheme 3 below):

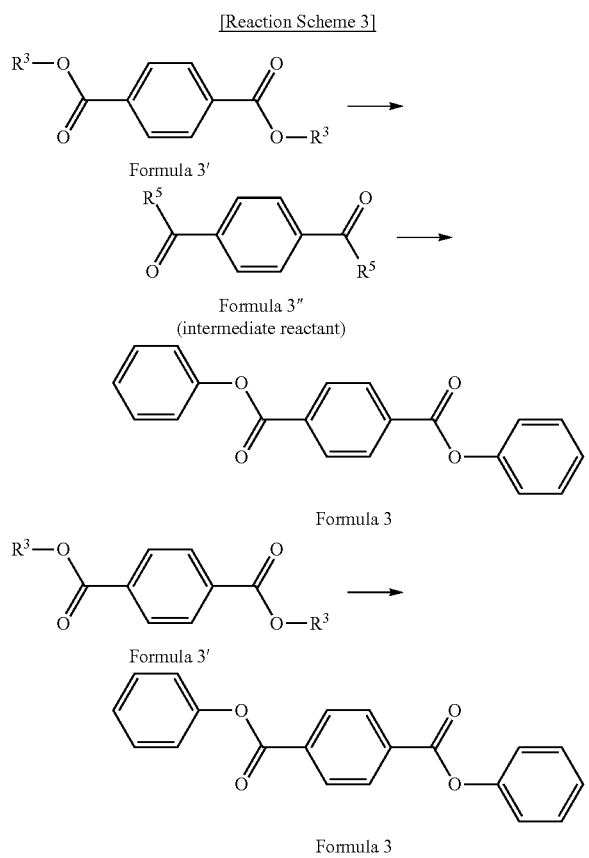

In the above Reaction Scheme, $R^3$ is each independently hydrogen or methyl, and $R^5$ is each independently F, Cl, or Br.

The compound represented by the above Formula 3' may be reacted with a halogenated compound to prepare an intermediate reactant (e.g., a compound represented by the above Formula 3") containing a halogen functional group at the terminal. The compound represented by the above Formula 3" may be terephthaloyl chloride (TPC) in which $R^5$ is Cl.

In addition, the specific type and amount of the halogenated compound are the same as described above.

In addition, the process of preparing an intermediate reactant by reacting the compound represented by the above Formula 3' with the halogenated compound, for example, the reaction temperature and time, the type of organic solvent used, the type of catalyst and the amount used are the same as the process of preparing the compound represented by the above Formula 2".

Further, the process of preparing the compound represented by Formula 3 from the compound represented by Formula 3" by a nucleophilic reaction is also the same as the process of preparing the compound represented by Formula 2 by subjecting the compound represented by Formula 2" to a nucleophilic reaction.

In addition, the compound represented by the above Formula 3 may be prepared by an esterification or transesterification reaction of a compound represented by the above Formula 3' with phenol or a phenol substituent. The specific conditions (reaction temperature, pressure, used amounts, and the like) of the esterification or transesterification reaction are the same as described above.

The melt-polycondensation reaction may be carried out with temperature elevation and depressurization in a stepwise manner in order to rapidly remove by-products from the molten reactants having a high viscosity and to promote the polymerization reaction.

Specifically, the melt-polycondensation reaction may comprise (1) a first reaction at a reduced pressure of 50 to 700 Torr and at a temperature of 130 to 250° C., 140 to 240° C., or 150 to 230° C. for 0.1 to 10 hours or 0.5 to 5 hours; and (2) a second reaction at a reduced pressure of 0.1 to 20 Torr and at a temperature of 200 to 350° C., 220 to 280° C., or 230 to 270° C. for 0.1 to 10 hours or 0.5 to 5 hours.

Specifically, the melt-polycondensation reaction may comprise (1) a first reaction under the conditions of raising the temperature to 130 to 200° C., followed by reducing the pressure to 200 to 700 Torr, and raising the temperature to 200 to 250° C. at a rate of 0.1 to 10° t/minute, followed by reducing the pressure to 50 to 180 Torr; and (2) a second reaction under the conditions of reducing the pressure to 1 to 20 Torr and raising the temperature to 200 to 350° C. at a rate of 0.1 to 5° C./minute, followed by reducing the pressure to 0.1 to 1 Torr.

Meanwhile, phenol may be produced as a reaction by-product during the melt-polycondensation reaction. It is preferable that phenol produced as a by-product is removed from the reaction system in order to shift the reaction equilibrium towards the production of the copolycarbonate ester.

If the rate of temperature elevation in the melt-polycondensation reaction is within the above ranges, it is possible to prevent the problem that phenol, a reaction by-product, evaporates or sublimes together with the reaction raw materials. Specifically, the copolycarbonate ester may be prepared in a batch or continuous process.

In particular, if 1,4:3,6-dianhydrohexitol (a-1) is used, it is preferable that the melt-polycondensation reaction is carried out at a relatively low reaction temperature in order to prepare a polymer having high transparency. In addition, in order to secure the mechanical properties of the copolycarbonate ester thus prepared, it is preferable that the melt-polycondensation reaction is carried out to a high degree of polymerization. For this purpose, it is effective to use a high viscosity polymerization reactor for the melt-polycondensation reaction. The target viscosity of the melt-polycondensation reaction may be 10,000 to 1,000,000 poises, 20,000 to 500,000 poises, or 30,000 to 200,000 poises.

Catalyst for the Melt-Polycondensation Reaction and Additives

In the above melt-polycondensation reaction, a catalyst may be used for enhancing the reactivity of the reaction. The catalyst may be added to the reaction step at any time, but it is preferably added before the reaction.

Any alkali metal and/or alkali earth metal catalyst commonly used in a polycarbonate melt-polycondensation reaction may be used as the catalyst. In addition, an oxide, hydride, amide, or phenolate of an alkali metal and/or an alkaline earth metal may be used as the catalyst.

Examples of the alkali metal catalysts may include lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), cesium acetate (CsOAc), and the like.

Examples of the alkali earth metal catalysts may include calcium hydroxide ($Ca(OH)_2$), barium hydroxide ($Ba(OH)_2$), magnesium hydroxide ($Mg(OH)_2$), strontium hydroxide ($Sr(OH)_2$), calcium carbonate ($CaCO_3$), barium carbonate ($BaCO_3$), magnesium carbonate ($MgCO_3$), strontium carbonate ($SrCO_3$), calcium acetate ($Ca(OAc)_2$), barium acetate ($Ba(OAc)_2$), magnesium acetate ($Mg(OAc)_2$), strontium acetate ($Sr(OAc)_2$), and the like.

Examples of the oxide, hydride, amide, or phenolate of an alkali metal and/or an alkaline earth metal may include magnesium oxide (MgO), barium oxide (BaO), sodium aluminate ($NaAlO_2$), zinc oxide (ZnO), lead oxide (PbO), dibutyltin oxide ($(C_4H_9)_2SnO$), antimony trioxide ($Sb_2O_3$), and the like.

Examples of the alkali metal and/or alkaline earth metal oxide may include magnesium oxide (MgO), barium oxide (BaO), sodium aluminate ($NaAlO_2$), zinc oxide (ZnO), lead oxide (PbO), dibutyltin oxide ($(C_4H_9)_2SnO$), antimony trioxide ($Sb_2O_3$), and the like.

The catalyst may be used in such an amount that the metal equivalent of the catalyst is greater than 0 to 5 mmol, greater than 0 to 3 mmol, or greater than 0 to 1 mmol, based on 1 mol of the entire diol compounds. If the amount of the catalyst is within the above range, side reactions are suppressed to obtain a polymer having excellent physical properties such as transparency. If it is outside the above range, there may be a problem that the target polymerization degree is not reached and that side reactions take place to lower the transparency of the polymer thus prepared.

Meanwhile, the alkali metal and/or alkaline earth metal catalyst may be used in combination with a basic catalyst such as a basic ammonium or amine, a basic phosphorous, or a basic boron compound. The basic catalyst may be used alone or in combination, and the amount thereof is not particularly limited.

In addition, if needed during the melt-polycondensation reaction, it may further comprise an additive such as an antioxidant, a heat stabilizer, a light absorber, a color former, a lubricant, a colorant, a conductive agent, a nucleation agent, a flame retardant, a plasticizer, an antistatic agent, and the like.

For example, the antioxidant and heat stabilizer may be hindered phenol, hydroquinone, phosphite, a substituted compound thereof, or the like.

Examples of the light absorber include resorcinol, salicylate, and the like.

Further, the color former may be phosphite, hydrophosphite, or the like. The lubricant may be montanic acid, stearyl alcohol, or the like.

A dye or a pigment may be used as the colorant, and carbon black may be used as the conductive agent or the nucleation agent.

The types and amounts of the aforementioned additives are not particularly limited as long as they do not adversely affect the properties, especially transparency, of the copolycarbonate ester thus prepared.

In addition, the present invention provides a molded article prepared from the copolycarbonate ester. The molded article may be prepared by molding the copolycarbonate ester resin by various molding methods such as injection molding, extrusion molding, blow molding, and profile extrusion molding, and post-processing such as thermoforming using the same. The specific shape and size of the molded article may be variously determined depending on the application, and examples thereof are not particularly limited.

As described above, the copolycarbonate ester prepared from the polymerization composition of the present invention is copolymerized by melt-polycondensation of 1,4:3,6-dianhydrohexitol and/or a diol compound other than 1,4:3,6-dianhydrohexitol, a carbonate compound, and an additional petroleum-based and/or biobased diphenyl ester, whereby it can have various physical properties. Thus, it can be advantageously used for the preparation of products for specified purposes.

Embodiments for Carrying Out the Invention

Hereinafter, the present invention will be described in more detail with reference to the following examples. However, these examples are set forth to illustrate the present invention, and the scope of the present invention is not limited thereto.

[Preparation Example] Synthesis of Biobased Monomers

Preparation Example 1: Synthesis of Biobased TPA 31.6 g of ethylenediamine (525 mmol), 3.34 g of anhydrous $FeCl_3$ (145 mmol), and 0.16 g of sodium (0.964 mmol) were mixed and heated at 50° C. under nitrogen. 101 g of biobased α-limonene (742 mmol; Sigma-Aldrich) was slowly added dropwise to the mixture, which was then heated to a temperature of 100 and maintained for 8 hours. Then, the reaction mixture was cooled to room temperature, diluted with 300 g of water, and extracted twice with 400 g of dichloromethane (DCM). The extracted organic layer was dried over magnesium sulfate and evaporated using a rotary evaporator to obtain crude para-cymene (yield: 99%).

288 g of 65% $HNO_3$ (2,968 mmol) was added to a mixture of the crude para-cymene and 400 g of water, which was then reacted. The reaction mixture was refluxed with heating for 1 day, then cooled to room temperature, and extracted with 530 g of DCM. Then, the extracted organic layer was washed twice with water and evaporated using a rotary evaporator to obtain para-cymene oxide.

83 g of NaOH (1,484 mmol) was added to a mixture of the para-cymene oxide and 1,000 g of water, which was then dissolved with stirring. Then, 235 g of potassium permanganate (1,484 mmol) was slowly added thereto, which was refluxed with heating for 16 hours to obtain a mixture in a slurry state. Thereafter, the slurry mixture was filtered through celite and then washed with water. Then, concentrated $H_2SO_4$ (98%) was added to the water layer until it became strongly acidic to obtain a white precipitate. The precipitate was filtered and washed with water and DCM.

All of the white solid products thus obtained were dried at 80° C. and 50 mmHg for 12 hours to obtain biobased TPA (yield: 93%).

Preparation Example 2: Synthesis of Biobased DMT 3.1 g of concentrated $H_2SO_4$ (31.6 mmol) was added to a mixture of 105 g of the biobased TPA (632 mmol) obtained in Preparation Example 1 and 1,650 g of methanol (6,320 mmol), which was refluxed with heating for 1 day. Thereafter, the solution was cooled to room temperature, and the solid obtained after the removal of the solvent was dissolved in 530 g of DCM. The solution was washed with water, and the organic layer was dried over magnesium sulfate and evaporated using a rotary evaporator to obtain a crude solid product. The solid product was washed with cold methanol and dried at 90° C. for 12 hours to obtain biobased DMT (yield: 95%). The biobased carbon content of the biobased DMT was 83%.

Preparation Example 3: Synthesis of Biobased DMCD

A fixed-bed continuous reactor was charged with a tablet-molded catalyst in which 1% by weight of ruthenium (Ru) had been supported on alumina. The biobased DMT obtained in Preparation Example 2 was supplied to the upper region of the reactor at a rate of 80 liter/h, along with hydrogen gas at a rate of 7 cm/s, and the ring hydrogenation reaction was carried out at a reaction pressure of 40 kgf/cm². The reaction temperature was maintained at 140° C. to 155° C. in the upper region of the reactor, 135° C. to 145° C. in the intermediate region of the reactor, and 125° C. to 135° C. in the lower region of the reactor, respectively, and the maximum temperature difference in the reactor was within 20° C. After the reaction for a period of 5 to 10 hours, a crude liquid product was obtained from the lower region of the reactor. The liquid product was subjected to vacuum distillation to obtain biobased DMCD. The biobased carbon content of the biobased DMCD was 83%.

Preparation Example 4: Synthesis of Biobased CHDM

A fixed-bed continuous reactor was charged with a tablet catalyst of copper chromium (CuCr). The biobased DMCD obtained in Preparation Example 3 was supplied to the upper region of the reactor at a rate of 120 liter/h, along with hydrogen gas at a rate of 10 cm/s, and the ester reduction hydrogenation reaction was carried out at a reaction pressure of 220 kgf/cm². The reaction temperature was maintained at 230° C. to 240° C. in the upper region of the reactor, 135° C. to 145° C. in the intermediate region of the reactor, and 225° C. to 235° C. in the lower region of the reactor, respectively, and the maximum temperature difference in the reactor was within 20° C. After the reaction for a period of 5 to 10 hours, a crude liquid product was obtained from the lower region of the reactor. The liquid product was subjected to vacuum distillation to obtain biobased CHDM. The biobased carbon content of the biobased CHDM was 83%.

Preparation Example 5: Synthesis of Biobased DPFD Using Biobased FDCA

A 1-liter round-bottom flask equipped with a 4-blade agitator, inlets for phosgene and nitrogen gas, an outlet for discharged gas, and a thermometer was charged with 100 g (0.60 mol) of biobased 2,5-furandicarboxylic acid (FDCA, Chemsky) and 200 g of toluene. The mixture was stirred at room temperature. 1.28 mol of phosgene gas was fed to the flask at atmospheric pressure for 10 hours to carry out the reaction. Thereafter, nitrogen gas was fed to the flask for 2 hours to remove the residual phosgene and hydrochloric acid gas produced as a by-product, thereby yielding a transparent and homogeneous reaction solution.

Then, 50% by weight of toluene initially supplied was distilled off from the reaction solution under a reduced pressure. Thereafter, a phenol solution in which 121 g (1.28 mol) of phenol had been dissolved in 121 g of toluene was added through a dropping funnel to the reaction solution for 2 hours. The mixture was stirred for 1 hour. Upon termination of the reaction, toluene was distilled off from the reaction solution under a reduced pressure to obtain a crude solid product. The solid product was purified by recrystallization and dried under vacuum at 80° C. for 12 hours to obtain biobased DPFD (yield: 85%). The biobased carbon content of the biobased DPFD was 98%.

[Example] Preparation of a Copolycarbonate Ester

Example 1

A 17-liter bench-scale reactor for polycondensation was charged with 1,401 g (9.59 mol) of isosorbide (ISB; Roquette Freres), 1,276 g (4.11 mol) of BPA TMC (Songwon), 1,333 g (4.11 mol) of DPCD (SK Chemical), 2,054 g (9.59 mol) of DPC (Changfeng), and 2 g of a 1% aqueous solution of sodium aluminate ($NaAlO_2$). The mixture was heated to 150° C. Once the temperature reached 150° C., the pressure was reduced to 400 Torr, and the temperature was then elevated to 190° C. over 1 hour. During the temperature elevation, phenol was discharged as a by-product of the polymerization reaction. When the temperature reached 190° C., the pressure was reduced to 100 Torr and maintained for 20 minutes, and then the temperature was elevated to 230° C. over 20 minutes. Once the temperature reached 230° C., the pressure was reduced to 10 Torr, and then the temperature was elevated to 250° C. over 10 minutes. The pressure was reduced to 1 Torr or less at 250° C., and the reaction continued until the target stirring torque was reached. Upon arrival at the target stirring torque, the reaction was terminated. The polymerized product pressurized and discharged was rapidly cooled in a water bath and then cut into pellets. The copolycarbonate ester thus prepared had a Tg of 184° C., an IV of 0.57 dl/g, and a biobased carbon content of 34%.

Example 2

A copolycarbonate ester was prepared in the same manner as in Example 1, except that 1,602 g (10.96 mol) of ISB, 960 g (2.74 mol) of BPA fluorene (TCI), 1,778 g (5.48 mol) of DPCD, and 1,761 g (8.22 mol) of DPC were used.

Example 3

A copolycarbonate ester was prepared in the same manner as in Example 1, except that 1,602 g (10.96 mol) of ISB, 631 g (2.74 mol) of TDD (Sigma-Aldrich), 2,181 g (6.85 mol) of DPT (SK Chemical), and 1,467 g (6.85 mol) of DPC were used.

Example 4

A copolycarbonate ester was prepared in the same manner as in Example 1, except that 1,401 g (9.59 mol) of ISB, 593 g (4.11 mol) of CHDM (SK Chemical), 1,333 g (4.11 mol) of DPCD, 2,181 g (6.85 mol) of DPT (SK Chemical), and 2,054 g (2.74 mol) of DPC were used.

Example 5

A copolycarbonate ester was prepared in the same manner as in Example 4, except that 2,002 g (13.70 mol) of ISB, 889 g (2.74 mol) of DPCD, 872 g (2.74 mol) of DPT, 845 g (2.74 mol) of biobased DPFD (Preparation Example 5), and 1,174 g (5.48 mol) of DPC were used.

Example 6

A copolycarbonate ester was prepared in the same manner as in Example 5, except that 1,401 g (9.59 mol) of ISB, 593 g (4.11 mol) of biobased CHDM (Preparation Example 4), 889 g (2.74 mol) of DPCD, 872 g (2.74 mol) of DPT, 845 g (2.74 mol) of biobased DPFD, and 1,174 g (5.48 mol) of DPC were used.

[Comparative Example] Preparation of a Biobased Polycarbonate Ester

Comparative Example 1

A polycarbonate ester was prepared in the same manner as in Example 1, except that a 17-liter bench-scale reactor for polycondensation was charged with 2,002 g (13.70 mol) of ISB, 1,333 g (4.11 mol) of DPCD, 2,054 g (9.59 mol) of DPC, and 2 g of a 1% aqueous solution of sodium aluminate ($NaAlO_2$). The polycarbonate ester thus prepared had a Tg of 154° C., an IV of 0.58 dl/g, and a biobased carbon content of 67%.

Comparative Example 2

A polycarbonate ester was prepared in the same manner as in Example 3, except that 2,002 g (13.70 mol) of ISB, 2,181 g (6.85 mol) of DPT, and 1,467 g (6.85 mol) of DPC were used.

Evaluation Example

The copolycarbonate esters and biobased polycarbonate esters of Examples 1 to 6 and Comparative Examples 1 and 2 were each evaluated for their physical properties by the following methods. The measured physical properties are shown in Table 1 below.

(1) Glass Transition Temperature (Tg)

The glass transition temperature was measured using a differential scanning calorimeter (Q20, TA Instruments) in accordance with ASTM D3418.

(2) Intrinsic Viscosity (IV)

A sample was dissolved in o-chlorophenol at a concentration of 1.2 g/dl at 150° C. for 15 minutes. The intrinsic viscosity of the sample was measured in a thermostat at 35° C. using an Ubbelodhe viscometer.

(3) Light Transmittance (T)

The light transmittance (%) was measured using a spectrophotometer (CM-3600A, Konica Minolta) in accordance with ASTM D1003.

(4) Melt Flow Index (MFI)

The melt flow index was measured using a melt indexer (G-01, TOYOSEIKI) under the conditions of 260° C. and a load of 2.16 kg in accordance with ASTM D1238.

(5) Biobased Carbon Content

The biobased carbon content (%) was measured using an accelerator mass spectroscopy (Beta Analytic Co.) according to ASTM D6866-16.

TABLE 1

| | | Ex. 1 | Ex. 2 | Ex. 3 | Ex. 4 | Ex. 5 | Ex. 6 | C. Ex. 1 | C. Ex. 2 |
|---|---|---|---|---|---|---|---|---|---|
| Comp. | ISB | 0.7 | 0.8 | 0.8 | 0.7 | 1 | 0.7 | 1 | 1 |
| | BPA TMC | 0.3 | — | — | — | — | — | — | — |
| | BPA Fluorene | — | 0.2 | — | — | — | — | — | — |
| | TDD | — | — | 0.2 | — | — | — | — | — |
| | CHDM | — | — | — | 0.3 | — | — | — | — |
| | Biobased CHDM (Prep. Ex. 4) | — | — | — | — | — | 0.3 | — | — |
| | DPC | 0.7 | 0.6 | 0.5 | 0.2 | 0.4 | 0.4 | 0.7 | 0.5 |
| | DPCD | 0.3 | 0.4 | — | 0.3 | 0.2 | 0.2 | 0.3 | — |
| | DPT | — | — | 0.5 | 0.5 | 0.2 | 0.2 | — | 0.5 |
| | Biobased DPFD (Prep. Ex. 5) | — | — | — | — | 0.2 | 0.2 | — | — |
| Physical property | Tg (° C.) | 184 | 178 | 154 | 155 | 188 | 150 | 154 | 201 |
| | IV (dl/g) | 0.57 | 0.56 | 0.54 | 0.55 | 0.53 | 0.58 | 0.58 | 0.53 |
| | T (%) | 90 | 90 | 91 | 91 | 90 | 91 | 92 | 90 |
| | MFI (g/10 min) | 85 | 82 | 43 | 46 | 31 | 63 | 125 | 3 |
| | Biobased carbon content | 34 | 39 | 40 | 35 | 70 | 72 | 67 | 59 |

As shown in Table 1 above, the copolycarbonate esters of Examples 1 and 2, prepared by copolymerization of BPA-based monomers, had a relatively high glass transition temperature of 170° C. as compared with the biobased polycarbonate esters of Comparative Examples 1 and 2, prepared using 1,4:3,6-dianhydrohexitol only. Thus, they are suitable for applications that require high heat resistance. In addition, they also had melt flow index and light transmittance superior, or equal, to those of Comparative Example 2.

In addition, in the copolycarbonate ester of Example 3 in which TDD, which is a petroleum-based monomer, was copolymerized with the composition of Comparative Example 2, the glass transition temperature was lower than that of Comparative Example 2, whereas the melt flow index increased, thereby increasing the flowability. In addition, in the copolycarbonate ester of Example 4 in which DPCD and CHDM, which are petroleum-based monomers, were copolymerized with the composition of Comparative Example 2, the glass transition temperature, light transmittance, melt flow index, and biobased carbon content were similar to those of Example 3.

Meanwhile, the copolycarbonate ester of Example 5 using DPFD, which is a biobased monomer, had a biobased carbon content of 70%, whereby it is environmentally friendly, and a high glass transition temperature, whereby it is excellent from the viewpoint of heat resistance.

In addition, in the copolycarbonate ester of Example 6 in which biobased CHDM was copolymerized with the composition of Example 5, the glass transition temperature was lower than that of Example 5, whereas it was excellent from the viewpoint of biobased carbon content, transmittance, and melt flow index.

Therefore, as can be seen from the above results, the physical properties of the copolycarbonate esters prepared through the use of various comonomers can be appropriately adjusted for use.

The invention claimed is:

1. A polymerization composition, which comprises (a) (a-1) 1,4:3,6-dianhydrohexitol and (a-2) a diol compound other than 1,4:3,6-dianhydrohexitol; and
   (b) (b-1) a carbonate compound represented by the following Formula 1, (b-2) a compound represented by the following Formula 2, a compound represented by the following Formula 3, or both, and (b-3) an additional diphenyl ester compound other than the compounds of the above Formulae 2 and 3,
   wherein when the mol fraction of the component (a-1) is x (0.1≤x≤1), the mol fraction of the component (a-2) is 1−x, and when the total mol fraction of the components (b-1) and (b-2) is y (0.1≤y≤1), the mol fraction of the component (b-3) is 1−y, provided that both x and y are not 1 at the same time:

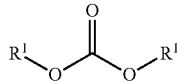
[Formula 1]

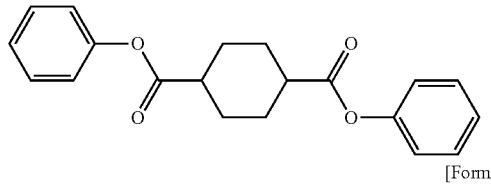
[Formula 2]

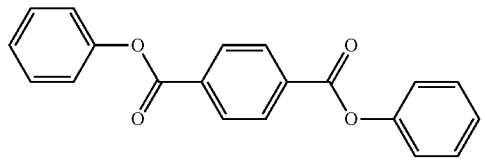
[Formula 3]

in the above formulae, $R^1$ is each independently an alkyl group having 1 to 18 carbon atoms or an aryl group having 6 to 18 carbon atoms, wherein the aryl group may have at least one substituent selected from the group consisting of an alkyl group having 1 to 18 carbon atoms, a cycloalkyl group having 4 to 20 carbon atoms, an aryl group having 6 to 18 carbon atoms, an alkoxy group having 1 to 18 carbon atoms, a cycloalkoxy group having 4 to 20 carbon atoms, an aryloxy group having 6 to 18 carbon atoms, an alkylsulfonyl group having 1 to 18 carbon atoms, a cycloalkylsulfonyl group having 4 to 20 carbon atoms, an arylsulfonyl group having 6 to 18 carbon atoms, and an ester substituent and wherein a copolycarbonate ester prepared from the polymerization composition has a biobased carbon content derived from biomass according to ASTM D6866 of 30 % or more and has a melt flow index (MFI) of 43 g/10 minutes to 85 g/10 minutes under a load of 2.16 kg at 260° C. according to ASTM D1238; and wherein the mol fraction of the component (a-1) is 0.7 to 0.8, the mol fraction of the component (a-2) is 0.2 to 0.3, the mol fraction of the component (b-1) is 0.2 to 0.7, and the mol fraction of the component (b-2) is 0.3 to 0.8.

2. The polymerization composition of claim 1, wherein the compound represented by the above Formula 2, the compound represented by the above Formula 3, and the components (a-2) and (b-3) are each independently biobased monomers derived from at least one selected from the group consisting of sugar, limonene, and lignin.

3. The polymerization composition of claim 1, wherein the component (a-2) is at least one diol compound selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol, tricyclodecane dimethanol, pentacyclopentadecanedimethanol, decalindimethanol, tricyclotetradecanedimethanol, norbornanedimethanol, adamantanedimethanol, 3,9-bis(1,1-dimethyl-2-hydroxyethyl)-2,4,8,10-tetraoxaspiro[5,5]undecane, bicyclo[2.2.2]octane-2,3-dimethanol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbornanediol, adamantanediol, 2,2-bis(4-hydroxycyclohexyl)propane, 2,2,4,4-tetramethyl-1,3-cyclobutanediol, hydroquinone, biphenol, 2,2'-biphenol, 1,5-dihydroxynaphthalene, 2,2-bis(4-hydroxyphenyl)propane, 2,2-bis(4-hydroxy-3,5-dimethylphenyl)propane, 2,2-bis(4-hydroxy-3,5-diethylphenyl)propane, 1,1-bis(4-hydroxyphenyl)-1-phenyl-ethane, 1,1-bis(4-hydroxyphenyl)cyclohexane, 1,1-bis(4-hydroxyphenyl)-3,3,5-trimethyl-cyclohexane, 5,5'-(1-methylethyliden)-bis[1,1'-(bisphenyl)-2-ol]propane, 1,4-bis[2-(4-hydroxyphenyl)-2-propyl]benzene, bis(4-hydroxyphenyl)sulfone, 1,3-bis[2-(4-hydroxyphenyl)-2-propyl]benzene, 2,2-bis(4-hydroxy-3-isopropyl-phenyl)propane, bis(4-hydroxyphenyl)methane, 1,1-bis(4-hydroxyphenyl)ethane, bis(4-hydroxyphenyl)-2,2-dichloroethylene, 2,2-bis(3-methyl-4-hydroxyphenyl)propane, bis(4-hydroxyphenyl)diphenylmethane, 2,2-bis(4-hydroxyphenyl)butane, 2,2-bis(4-hydroxyphenyl)hexafluoropropane, 3-(4-hydroxyphenyl)-1,1,3-trimethyl-5-indanol, 9,9-bis(4-hydroxyphenyl)fluorene, 3,3'-spiro-bis(1,1-dimethyl-2,3-dihydro-1H-inden-5-ol, dispiro[5.1.5.1]tetradecane-7,14-diol, 5,5'-(1-methylethylidene)bis(2- furanmethanol), 2,4:3,5-di-o-methylene-D-mannitol, and tetrahydrofuran-2,5-dimethanol.

4. The polymerization composition of claim 3, wherein the component (a-2) is 1,14-tetradecanediol, 1,4-cyclohexanedimethanol, tricyclodecane dimethanol, 3,9-bis(1,1-dimethyl-2-hydroxyethyl)-2,4,8,10-tetraoxaspiro[5,5]undecane, bicycle[2.2.2]octane-2,3-dimethanol, 2,2-bis(4-hydroxycyclohexyl)propane, 2,2,4,4-tetramethyl-1,3-cyclobutanediol, 1,1-bis(4-hydroxyphenyl)-3,3,5-trimethylcyclohexane, 9,9-bis(4-hydroxyphenyl)fluorene, or tetrahydrofuran-2,5-dimethanol.

5. The polymerization composition of claim 1, wherein the component (b-3) is at least one selected from the group consisting of diphenyl oxalate, diphenyl malonate, diphenyl succinate, diphenyl glutarate, diphenyl adipate, diphenyl pimelate, diphenyl suberate, diphenyl azelate, diphenyl sebacate, diphenyl undecanedioate, diphenyl dodecanedioate, diphenyl tridecanedioate, diphenyl tetradecanedioate, diphenyl pentadecanedioate, diphenyl hexadecanedioate, 1,2-diphenyl-cyclohexanedicarboxylate, 1,3-diphenyl-cyclohexanedicarboxylate, diphenyl decahydronaphthalene-2,4-dicarboxylate, diphenyl decahydronaphthalene-2,5-dicarboxylate, diphenyl decahydronaphthalene-2,6-dicarboxylate, diphenyl decahydronaphthalene-2,7-dicarboxylate, diphenyl tetrahydrofuran-2,5-dicarboxylate, diphenyl isophthalate, 4,4'-diphenyl-biphenyldicarboxylate, 4,4'-diphenyl-ethylidenebisbenzoate, 4,4'-diphenyl-oxybisbenzoate, 2,4-diphenyl-naphthalenedicarboxylate, 2,5-diphenyl-naphthalenedicarboxylate, 2,6-diphenyl-naphthalenedicarboxylate, 2,7-diphenyl-naphthalenedicarboxylate, and 2,5-diphenyl-furandicarboxylate.

6. The polymerization composition of claim 5, wherein the component (b-3) is diphenyl sebacate, diphenyl decahydronaphthalene-2,6-dicarboxylate, diphenyl tetrahydrofuran-2,5-dicarboxylate, or 2,5-diphenyl-furandicarboxylate.

7. A process for preparing a copolycarbonate ester, which comprises subjecting the polymerization composition of claim 1 to a melt-polycondensation reaction to prepare a copolycarbonate ester.

8. The process for preparing a copolycarbonate ester of claim 7, wherein the melt-polycondensation reaction comprises (1) a first reaction at a reduced pressure of 50 to 700 Torr and at a temperature of 130 to 250° C. for 0.1 to 10 hours; and (2) a second reaction at a reduced pressure of 0.1 to 20 Torr and at a temperature of 200 to 350° C. for 0.1 to 10 hours.

9. A copolycarbonate ester prepared from the polymerization composition of claim 1.

10. The copolycarbonate ester of claim 9, which has a glass transition temperature of 100 to 240° C.

11. A molded article prepared from the copolycarbonate ester of claim 9.

12. The polymerization composition of claim 1, wherein the carbonate compound (b-1) is diphenyl carbonate.

* * * * *